Patented June 22, 1954

2,681,914

UNITED STATES PATENT OFFICE 2,681,914

THIAZOLYL-2, DIMETHYL CARBAMATES

Hans Gysin, Alfred Margot, and Charles Simon, Basel, Switzerland, assignors to J. R. Geigy A. G., Basel, Switzerland, a Swiss firm No Drawing. Application December 9, 1952, Serial No. 325,015

Claims priority, application Switzerland August 22, 1949

3 Claims. (Cl. 260—302)

This application is a continuation-in-part of our pending application Ser. No. 178,986 filed August 11, 1950.

The present invention is concerned with thiazolyl-(2)-dimethyl carbamates of the general formula:

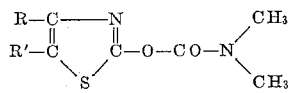

wherein R and R' represent radicals selected from the group consisting of hydrogen and lower alkyl. These compounds are excellently suited for combatting pests such as insects, especially flies, and other arthropods and also their stages of development.

The new compounds can be produced, for example, by the reaction of dimethyl carbamic acid chloride with 2-thiazolones of the general formula

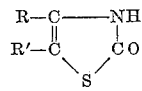

wherein R and R' have the meanings given above.

As such compounds may be named, e. g.: 4-methyl-thiazolone-(2), 4-ethyl-thiazolone-(2), 4-n-propyl-thiazolone-(2), 4-isopropyl-thiazolone-(2), 4-n-butyl-thiazolone-(2), 4-tert. butyl-thiazolone-(2), 5-methyl-thiazolone-(2), 5-ethyl-thiazolone-(2), 5-n-propylthiazolone-(2), 5-n-butyl-thiazolone-(2), 4,5-dimethyl-thiazolone-(2), 4-methyl-5-ethyl-thiazolone-(2), 4-methyl-5-n-propyl-thiazolone-(2), 4-ethyl-5-methyl-thiazolone-(2), 4-n-propyl-5-ethyl-thiazolone-(2), 4-n-butyl-5-n-propyl-thiazolone-(2). The reaction may be performed in the presence of acid binding agents or with salts of the enol form of the above named compounds.

The reaction may take place in the presence or absence of solvents such as benzene, acetone, dioxan, and acetic acid ethyl ester. Acid binding agents which come into consideration are, e. g. potassium carbonate, sodium carbonate, sodium bicarbonate, sodium ethylate, or tertiary organic bases such as triethylamine. In particular, the alkali salts are suitable as enol salts.

The following example illustrates the production of the new compounds. Parts are always given as parts by weight and the temperatures are given in degrees centigrade.

Example 1

115 parts of 4-methyl-thiazolone-(2) are heated with 600 parts of benzene and 135 parts of potassium carbonate and the benzene is distilled off until no more water passes over. The mixture is cooled and then 120 parts of dimethyl carbamic acid chloride are added. Care should be taken that the reaction does not take place too vigorously, by cooling if necessary. On completion of the reaction, the mixture is heated to boiling for 10–12 hours, and the water which is so formed is removed in a separator. The reaction mixture is then cooled, and 400 parts of water and enough potassium carbonate solution is added so that the reaction of the watery solution definitely remains phenolphthalein alkaline after thoroughly shaking with the benzene layer. After separating off the watery part, the benzene solution is washed with water until a neutral reaction is obtained, then the benzene is distilled off. After removal of some unchanged dimethyl carbamic acid chloride, the 4-methyl-thiazolyl-(2)-dimethyl carbamate boils at 110–112° at 0.2 mm. pressure. In a pure form, the substance melts at 65°.

In the same manner, 5-methyl-thiazolyl-(2)-dimethyl carbamate and 4,5-dimethyl-thiazolyl-(2)-dimethyl carbamate can be produced.

The biological properties of the new compounds are useful in various fields of pest control and the mode of employment depends entirely on the intended use. The active compounds can be used as such, e. g. in powder form, in the form of gas or mist or as smoke. For most purposes, however, it is more economical to combine them with suitable carriers and distributing agents. A number of such substances suitable for the usual forms of application such as dusting agents, spraying agents (suspensions) solutions, aerosols, emulsions and semisolid preparations (ointments) are given below.

As solid pulverulent carriers may be used, e. g. calcium carbonate, in the form of whiting or ground limestone, kaolin, bole, bentonite, talcum, powdered magnesia, kieselguhr, boric acid, tricalcium phosphate, and also powdered wood, powdered cork and other materials of a vegetable nature. By the addition of wetting agents and protective colloids the pulverulent preparations can be suspended in water and use as spraying agents. The active substance can be combined with the carrier for example by impregnating the carrier with solutions of the active ingredient, by mixing the molten active ingredient with the carriers, or by milling the components together.

Solutions (for spraying) in high boiling carrier solvents such as kerosene and similar mineral oil fractions, in methyl naphthalenes, xylenes, etc. are best suited for direct spraying of objects. They can also be used for impregnating wood. Solutions in lower boiling solvents such as trichlor-ethylene, tetrachlorethane, ethylene chloride are most suitable for spreading the active ingredient in the form of a mist. The latter solvents, and also, for example, benzine, xylene and chlorobenzene are also suitable for the impregnation of textiles. The active substances are soluble in water to some extent. Water, therefore, if required with the addition of solvents, also comes into consideration as a carrier-solvent and also water soluble organic solvents such as alcohol or acetone.

Fluoro-trichloromethane and difluoro-dichloromethane are examples of solvents and propelling agents for aerosols.

As emulsifying agents there come into consideration those of a cation-active nature such as quaternary ammonium compounds, anion-active agents such as soap, soft soap, resin soap, aliphatic monoesters of sulphuric acid and aliphatic aromatic sulphonic acids, and also non-ionogenic emulsifying agents such as higher molecular ethylene oxide condensation products. They are mixed to an emulsifiable concentration with the active ingredient with or without the addition of suitable solvents such as e. g. acetone, alcohols, cyclohexanone, benzene, toluene, xylene, tetrahydronaphthalene, alkylated naphthalenes, phthalic acid esters, mineral and vegetable oils, resins, and if desired, water.

Petroleum jelly and other ointment bases in which the active igredient can be incorporated are examples of semi-solid distributing agents.

The active ingredients can also be used together with attractives or lures to form a bait, such as, e. g. sugar for example in the form of dusting agents with sugar as the main carrier, or spraying agents or in the form of fly-papers.

The various forms of application can generally be adapted to the intended use by the addition of substances which improve the distribution, the adhesive properties and resistance to rain on the treated surface, such as, e. g. fatty acids, resins, wetting agents, glue, casein or alginates. The biological activity can also be increased by the addition of substances with bactericidal, fungicidal or also insecticidal properties.

As bactericidal substances that can be added come into consideration, e. g. chlorinated phenols and quaternary ammonium compounds; suitable fungicidal compounds include e. g. sulphur in its various forms of application, such as lime-sulphur liquid, copper compounds such as copper oxychloride or Bordeaux liquid, and fluorides. As examples of further insecticidal compounds may be named synthetic products like 1.1-bis-(p-chlorophenyl)-2.2.2-trichlorethane, γ-hexachlorocyclohexane, p-nitrophenyl-diethyl-thiophosphate, tetra-ethyl-pyrophosphate, chlorinated camphene, 1.2.4.5.6.7-8.8-octachloro - 4.7-methano-3a.4.7.7a-tetrahydroindane, and 5.5-dimethyl-dihydroresorcinol-dimethyl carbamate. Pyrethrin and rotenone are suitable vegetable products.

*Example 2.—Sprinkling agent (spray)*

(a) 2 parts of active ingredient, e. g. 4-methyl-thiazolyl-(2)-dimethyl carbamate are dissolved in 10 parts of xylene and 88 parts of kerosene.

(b) 2 parts of active ingredient, e. g. 4-methyl-thiazolyl-(2)-dimethyl carbamate and 3 parts of 1.1-bis-(p-chlorophenyl) - 2.2.2 - trichlorethane are dissolved in 10 parts of xylene or another mutual solvent and 85 parts of kerosene.

Both solutions are excellently suited for combatting flies in the household and also in storerooms and slaughterhouses.

*Example 3.—Fumigating agent*

(a) 20 parts of active ingredient, e. g. 4-methyl-thiazolyl-(2)-dimethyl carbamate are mixed with 61 parts of sawdust which has previously been impregnated with 18.4 parts of potassium nitrate. The mass is shaped into tablet form under pressure.

(b) 50 parts of active ingredient, e. g. 4-methyl-thiazolyl-(2)-dimethyl carbamate, 22 parts of sugar, 12 parts of potassium chlorate, 2.4 parts of potassium nitrate and 13.6 parts of sawdust are ground and thoroughly mixed together. The mass is put into boxes and it is set alight by either a wick or a fuse.

The insecticidal smoke formed by burning the tablets or the boxed fumigating mass is specially suitable for combatting insects in enclosed spaces.

*Example 4.—Gas*

4 - methyl - thiazolyl-(2)-dimethyl carbamate either as such or with suitable additives which help vaporisation by heating, e. g. on an electrically heated plate, is evaporated and in this way kills insects in enclosed spaces.

What we claim is:

1. As new chemical compounds, the dimethyl carbamates of the general formula:

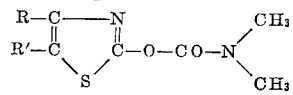

wherein R and R' represent radicals selected from thet group consisting of hydrogen and lower alkyl.

2. A pest combatting agent comprising as an active ingredient a compound of the general formula:

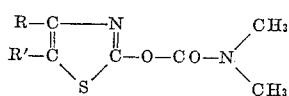

wherein R and R' represent radicals selected from the group consisting of hydrogen and lower alkyl.

3. As a new chemical compound, the 4-methyl-thiazolyl-(2)-dimethyl carbamate.

No references cited.